(12) United States Patent
Abe et al.

(10) Patent No.: US 7,324,748 B2
(45) Date of Patent: Jan. 29, 2008

(54) FOCAL PLANE SHUTTER AND IMAGE SENSING APPARATUS

(75) Inventors: Wataru Abe, Sakai (JP); Yoshiharu Tanaka, Kawachinagano (JP); Toshihiko Hirota, Sakai (JP)

(73) Assignee: Konica Minolta Photo Imaging Inc., Tokyo (JP)

( * ) Notice: Subject to any disclaimer, the term of this patent is extended or adjusted under 35 U.S.C. 154(b) by 343 days.

(21) Appl. No.: 11/219,185

(22) Filed: Sep. 2, 2005

(65) Prior Publication Data

US 2006/0056839 A1  Mar. 16, 2006

(30) Foreign Application Priority Data

Sep. 13, 2004 (JP) .............................. 2004-265907

(51) Int. Cl.
*G03B 17/00* (2006.01)
*G03B 19/12* (2006.01)
*H04N 5/228* (2006.01)

(52) U.S. Cl. .................... 396/55; 396/357; 396/452; 348/208.7

(58) Field of Classification Search ............ 396/52–55, 396/452, 357; 348/208.4, 208.7
See application file for complete search history.

(56) References Cited

U.S. PATENT DOCUMENTS

| 2002/0094200 | A1* | 7/2002 | Yamaguchi | 396/55 |
| 2006/0017815 | A1* | 1/2006 | Stavely et al. | 348/208.7 |
| 2006/0177209 | A1* | 8/2006 | Miyasako | 396/55 |
| 2006/0257128 | A1* | 11/2006 | Ishito et al. | 396/55 |

FOREIGN PATENT DOCUMENTS

| JP | 8-313776 | 11/1996 |
| JP | 11-174525 | 7/1999 |
| JP | 11-218838 | 8/1999 |
| JP | 2002-122902 | 4/2002 |
| JP | 2003-222923 A | 8/2003 |
| JP | 2004-104652 | 4/2004 |

* cited by examiner

*Primary Examiner*—Christopher Mahoney
(74) *Attorney, Agent, or Firm*—Brinks Hofer Gilson & Lione (57) ABSTRACT

The size of the opening 1094a of the shutter base plate 1094 is set, considering driving amounts of the image sensor 101 and the low pass filter 108 during shake correction, so that the size of the opening 1094a in X-axis direction (Y-axis direction) is set equal to or larger than the sum of the size of the low pass filter 108 and the maximum moving amount of the low pass filter 108 in the X-axis direction (Y-axis direction). Specifically, the length Lx of the opening 1094a of the shutter base plate 1094 in the X-axis direction, and the length Ly thereof in the Y-axis direction respectively satisfy the following equations:

$$Lx \geq X + 2\Delta x$$

$$Ly \geq Y + 2\Delta y$$

where X represents the length of the low pass filter 108 in the X-axis direction, Y represents the length of the low pass filter 108 in the Y-axis direction, $\Delta x$ represents the maximum moving amount of the low pass filter 108 in the X-axis direction with respect to the centering position, and $\Delta y$ represents the maximum moving amount of the low pass filter 108 in the Y-axis direction with respect to the centering position.

4 Claims, 9 Drawing Sheets

FOCAL PLANE SHUTTER AND IMAGE SENSING APPARATUS

This application is based on Japanese Patent Application No. 2004-265907 filed on Sep. 13, 2004, the contents of which are hereby incorporated by reference.

BACKGROUND OF THE INVENTION

1. Field of the Invention

The present invention relates to an image sensing apparatus such as a digital still camera and a digital video camera equipped with a shake correction mechanism for correcting shake of the camera, as well as a focal plane shutter to be loaded in the image sensing apparatus.

2. Description of the Related Art

Figure 9A:
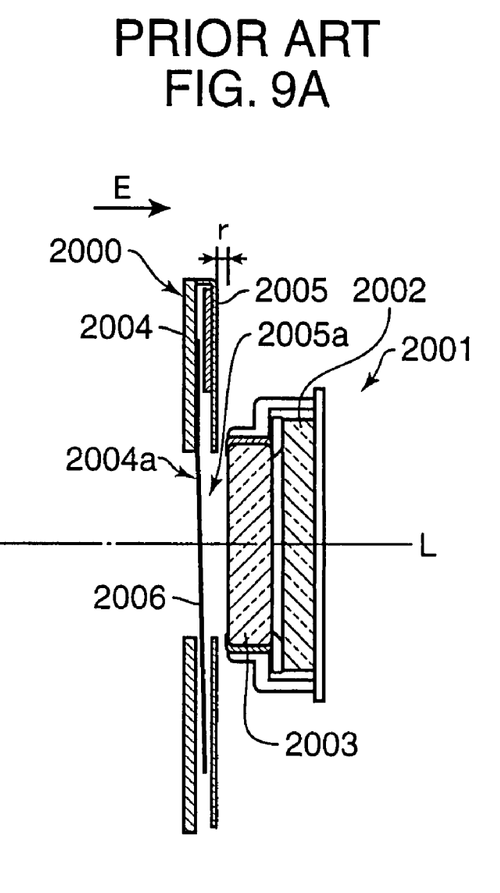
FIGS. 9A and 9B are illustrations showing a conventional arrangement constituted of a shutter section, an image sensor, and a low pass filter.
Figure 9B:
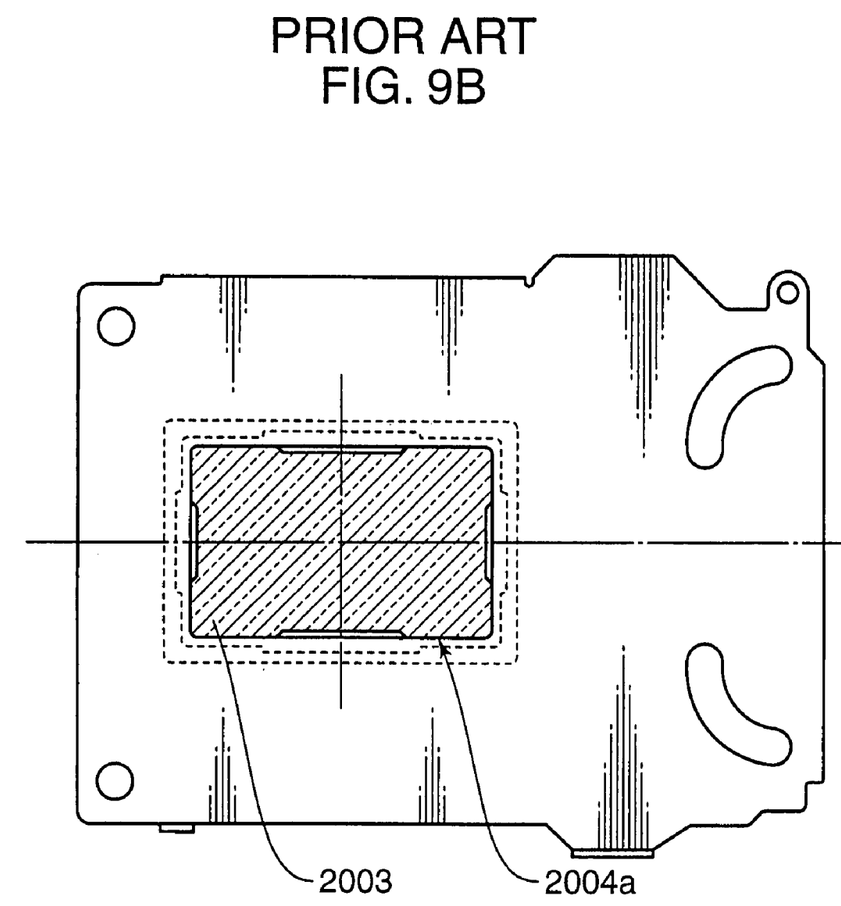

Generally, in a camera provided with a focal plane shutter and an image sensor, the focal plane shutter and the image senor have arrangements as shown in FIGS. 9A and 9B. FIG. 9A is a cross-sectional view schematically showing the arrangement of the image sensor taken along a plane including an optical axis of an unillustrated imaging optical assembly, and FIG. 9B is a plan view as viewed from the direction shown by the arrow E in FIG. 9A. It should be noted that in FIGS. 9A and 9B, a low pass filter is arranged on the imaging plane of the image sensor, and the image sensor and the low pass filter constitute an imaging unit, and is called as such hereinafter.

As shown in FIGS. 9A and 9B, the focal plane shutter 2000 and the imaging unit 2001 are aligned on the optical axis L of the unillustrated imaging optical assembly in such a manner that the light receiving planes of the image sensor 2002 and the low pass filter 2003 are perpendicular to the optical axis L.

The focal plane shutter 2000 is arranged in parallel with a plane perpendicular to the optical axis L on the side of an object to be photographed with respect to the imaging unit 2001, and includes a shutter bedplate 2004, a shutter base plate 2005, and a shutter blade group 2006.

The shutter bedplate 2004 and the shutter base plate 2005 are respectively formed with openings 2004a, and 2005a, so that light passing through the imaging optical assembly is guided onto the imaging unit 2001 through the openings 2004a, 2005a.

In the conventional focal plane shutter 2000, the opening 2005a of the shutter bedplate 2005 has a size substantially identical to an effective light receiving region for outputting pixel signals composing a sensed image. The opening 2004a of the shutter bedplate 2004 has the same size as or larger than the opening 2005a of the shutter base plate 2005.

There is known a technique of correcting shake of a digital camera by driving (oscillating) an image sensor to eliminate or suppress blur of a sensed image arising from the shake of the camera (see Japanese Unexamined Patent Publication No. 2003-222923). The publication discloses a camera equipped with actuators for driving the image sensor in one of two directions perpendicular to each other on the imaging plane of the imaging optical assembly, wherein blur of a sensed image due to shake of the camera is eliminated or suppressed by driving the image sensor in one of the two directions by the respective actuators.

A need exists for miniaturizing the camera to provide enhanced portability. There is an idea of devising a positional arrangement of the focal plane shutter 2000 and the imaging unit 2001 with respect to the optical axis direction as a means for reducing the thickness of the camera in the optical axis direction.

In the case where the shake correction based on driving of the image sensor 2002 is applied to the camera provided with the focal plane shutter, there is likelihood that light is blocked from being incident on the light receiving plane of the low pass filter 2003 by the shutter base plate 2005 in driving the imaging unit 2001 (image sensor 2002) in one of the two directions perpendicular to each other on the imaging plane of the image sensor 2002, if the opening 2005a of the shutter base plate 2005 has the size substantially identical to that of the effective light receiving region for outputting pixel signals composing a sensed image. If such a phenomenon occurs, it is likely that a properly sensed image may not be obtainable due to failure of partly receiving the light object image.

SUMMARY OF THE INVENTION

In view of the problems residing in the prior art, it is an object of the present invention to provide an image sensing apparatus provided with a focal plane shutter and a function of driving an image sensor that enables to acquire a properly sensed image while accomplishing miniaturization, as well as the focal plane shutter.

One aspect of the present invention is directed to a focal plane shutter for use in an image sensing apparatus having an imaging unit. The focal plane shutter comprises: a group of shutter blades; a driving member that drives the shutter blades in a certain direction in a predetermined order; a first bedplate formed with a first opening for passing light; and a second bedplate formed with a second opening larger than the first opening. The first bedplate and the second bedplate interpose the shutter blades with each other. The second bedplate is to be positioned closer to the imaging unit than the first bedplate.

In the above arrangement, miniaturization of the image sensing apparatus is ensured while acquiring a properly sensed image in providing a shake correction function in the image sensing apparatus equipped with the focal plane shutter.

These and other objects, features and advantages of the present invention will become more apparent upon reading of the following detailed description along with the accompanying drawings.

DETAILED DESCRIPTION OF THE PREFERRED EMBODIMENTS

Figure 1A:
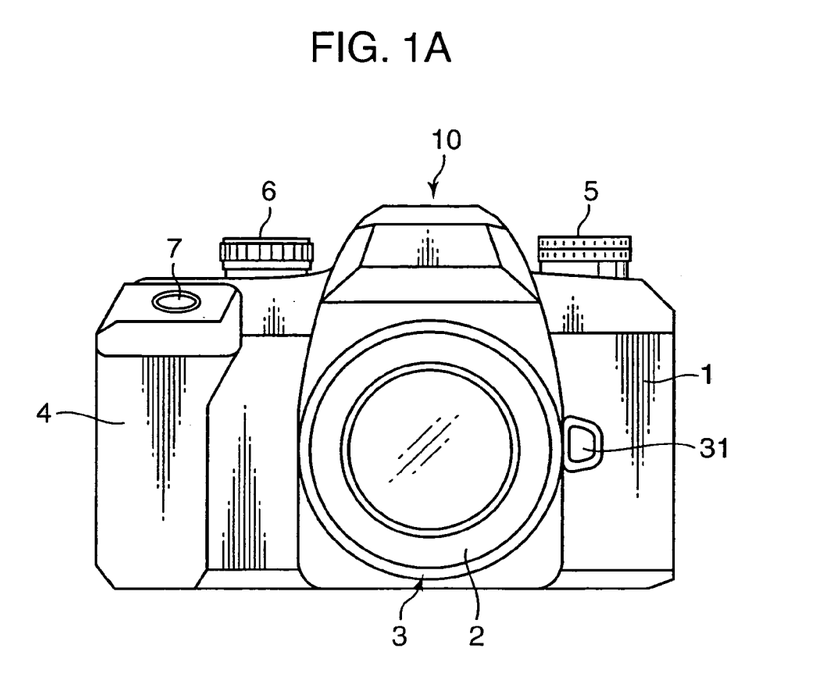
FIGS. 1A and 1B are illustrations each showing an external appearance of a digital camera, as an example of an image sensing apparatus embodying the present invention.
Figure 1B:
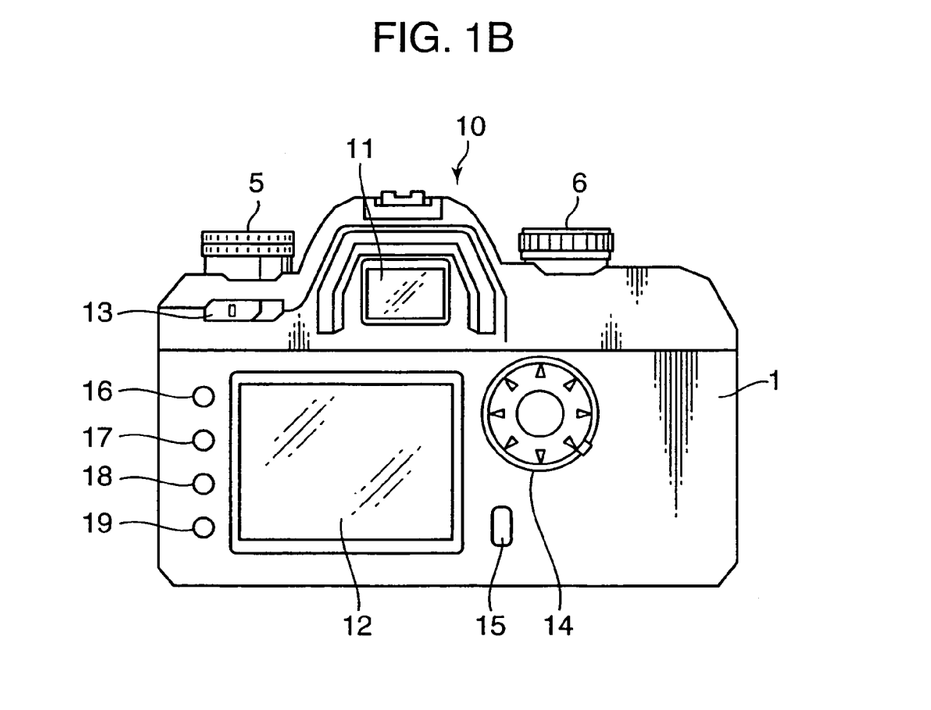

In the following, a digital camera exemplifying an image sensing apparatus in accordance with an embodiment of the present invention is described. FIGS. 1A and 1B are illustrations each showing an external appearance of the digital camera 10 embodying the present invention. FIG. 1A is a front view of the digital camera 10, and FIG. 1B is a rear view of the digital camera 10.

As shown in FIG. 1A, the digital camera 10 is a single-lens reflex digital still camera provided with a camera body 1, and a taking lens 2 which is detachably attachable substantially in the middle on a front portion of the camera body 1. The taking lens 2 is exchangeable.

Referring to FIG. 1A, the camera body 1 has a mount portion 3 for mounting the taking lens 2 substantially in the middle on the front portion thereof, a grip portion 4 which protrudes forward on a left end portion, on the front portion thereof for allowing a user to securely hold the camera 1 with his or her hand, a control value setting dial 5 arranged on an upper right portion of the camera body 1 for allowing the user to set a control value, a mode setting dial 6 arranged on an upper left portion of the camera body 1 for allowing the user to switch the photographing mode to a desired mode, and a release button 7 arranged on a top portion of the grip portion 4 for allowing the user to designate start or finish of photographing operation (exposure).

The taking lens 2 functions as a lens aperture for passing a light image of an object to be photographed, and includes a taking lens assembly for guiding the light image toward an image sensor 101 and a viewfinder section 102, which are arranged inside the camera body 1 and will be described later. The taking lens 2 can execute focus control by moving the positions of the respective lenses manually or automatically.

A detachment button 31 for allowing the user to detachably attach the taking lens 2, plural electric contacts (not shown) for electrically connecting the taking lens 2 with the camera body 1, and plural couplers (not shown) for mechanically connecting the taking lens 2 with the camera body 1 are provided in the vicinity of the mount portion 3. The electric contacts are adapted to send information inherent to the taking lens 2, such as f-number and focal length, from a lens read-only-memory dens ROM) built in the taking lens 2 to a main controller (not shown) provided in the camera body 1, and to send information regarding the positions of a focus lens and a zoom lens of the taking lens 2 to the main controller. The couplers are adapted to transmit respective driving forces of drive motors provided in the camera body 1 for driving the focus lens and the zoon lens to the respective lenses of the taking lens 2.

The mode setting dial 6 is adapted to set various photographing modes such as auto-exposure (AE) control mode, auto-focusing (AF) control mode, still image photography mode for photographing still images, moving image photography mode (continuous photography mode) for photographing moving images, and flash mode.

The release button 7 is a depressing type switch, and is settable to a halfway pressed state where the release button 7 is pressed halfway down, and to a fully pressed state where the release button 7 is pressed fully down. When the release button 7 is pressed halfway down in the still image photography mode, a preparatory operation for photographing a still image of an object such as setting an exposure control value and focal adjustment is executed. Subsequently, when the release button 7 is pressed fully down, a photographing operation, namely, a series of operations comprising exposing a color image sensor to light, processing image signals acquired by the exposure, and recording the processed signals in the memory card, are executed. On the other hand, when the release button 7 is pressed fully down in the moving image photography mode, a photographing operation, namely, a series of operations comprising exposing the color image sensor to light, processing image signals acquired by the exposure, and recording the processed signals in the memory card, are executed. Subsequently, when the release button 7 is pressed fully down again, the photographing operation is terminated.

Referring to FIG. 1B, a viewfinder window (eyepiece portion) 11 is formed in an upper portion substantially in the middle on a rear portion of the camera body 1. The light image of the object passing through the taking lens 2 is guided to the viewfinder window 11. A user (photographer) can view the object image through the viewfinder window 11. An external display section 12 such as an LCD monitor is formed substantially in the middle on the rear portion of the camera body 1. The external display section 12 is a color liquid crystal display device having pixels in the number of 400 (in X-direction corresponding to horizontal direction)× 300 (in Y-direction corresponding to vertical direction)=120, 000 in this embodiment, and is adapted to display a menu screen for allowing the user to set the AE/AF control mode, still image/moving image photography mode, or other photographing conditions, and to display photographed images that have been recorded in the memory card for playback in the playback mode, as well as displaying the moving images.

A power switch 13 is provided on an upper left portion of the external display section 12. The power switch 13 is, for instance, a slide switch of 2-contact. When the contact of the switch 13 is set to "OFF" position on the left side of the switch 13, the power of the camera 10 is turned off, and when the contact of the switch 13 is set to "ON" position on the right side of the switch 13, the power of the camera 10 is turned on. A direction selecting key 14 and a shake correction switch 15 are provided on the right side of the external display section 12. The direction selecting key 14 is a circular operation button. Upward, downward, leftward, and rightward directions, and upward right, upward left, downward right, and downward left directions are detectable with use of the direction selecting key 14. The direction selecting key 14 has multi-functions. For instance, the direction selecting key 14 functions as an operation switch for allowing the user to alter the item selected on the menu screen displayed on the external display section 12 for setting a desired photographic scene, and also functions as an operation switch for allowing the user to alter the selected frame of an image for playback on an index image screen where plural thumbnail images are displayed in a certain order. The direction selecting key 14 also functions as a zoom switch for allowing the user to change the focal length of the zoom lens of the taking lens 2.

The shake correction switch 15 is adapted to set a shake correction mode that enables to perform photographing free of image blur even in a condition that such an image blur may take place due to shake of the camera body 1 or the like, e.g., one-hand photographing, telephotographing, or photographing in a dark place where long time exposure is required. The shake correction switch 15 may be a slide switch of 2-contact as employed in the power switch 13.

A cancel switch 16, a determination switch 17, a menu display switch 18, and an external display changeover switch 19 are provided on the left side of the external display section 12 for allowing the user to designate display on the external display section 12 and to manipulate display contents displayed on the external display section 12. The cancel switch 16 is a switch for allowing the user to cancel the contents selected on the menu screen. The determination switch 17 is a switch for allowing the user to determine the contents selected on the menu screen. The menu display switch 18 is a switch for allowing the user to display the menu screen on the external display section 12 or to change over the contents of the menu screen between a photographic scene setting screen and a mode setting screen regarding exposure control, for instance. Each time the menu display switch 18 is depressed, the contents of the menu screen is changed. The external display changeover switch 19 is a switch for allowing the user to turn on and off the display of the external display section 12. Each time the external display changeover switch 19 is depressed, display on the external display section 12 is alternately turned on and off. Various switches of push button type or dial switches, other than the above switches, such as a zoom switch, an exposure correction switch, and an AE lock switch may be provided at appropriate positions on the camera body 1.

Figure 2:
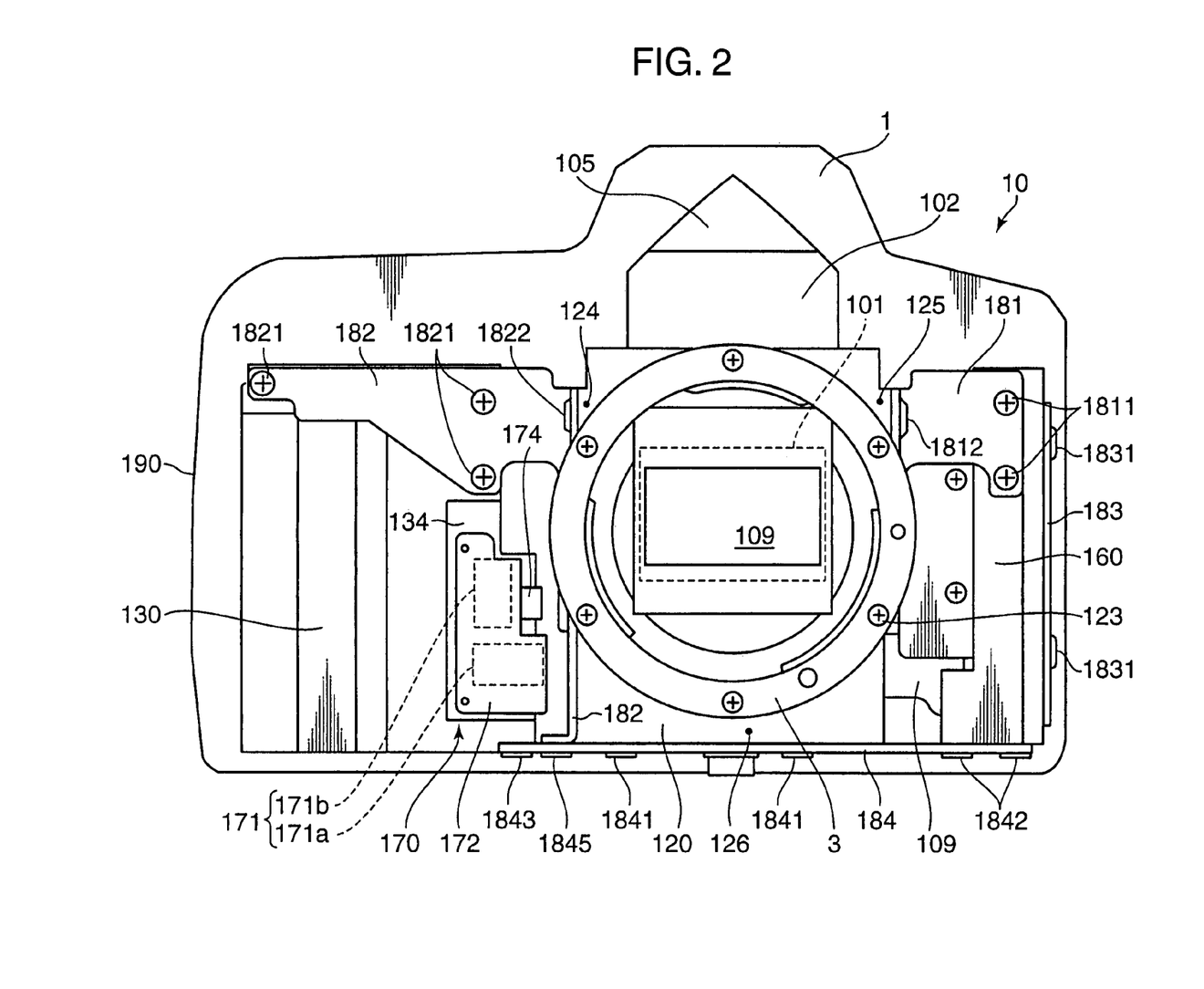
FIG. 2 is a perspective front view of the digital camera.
Figure 3:
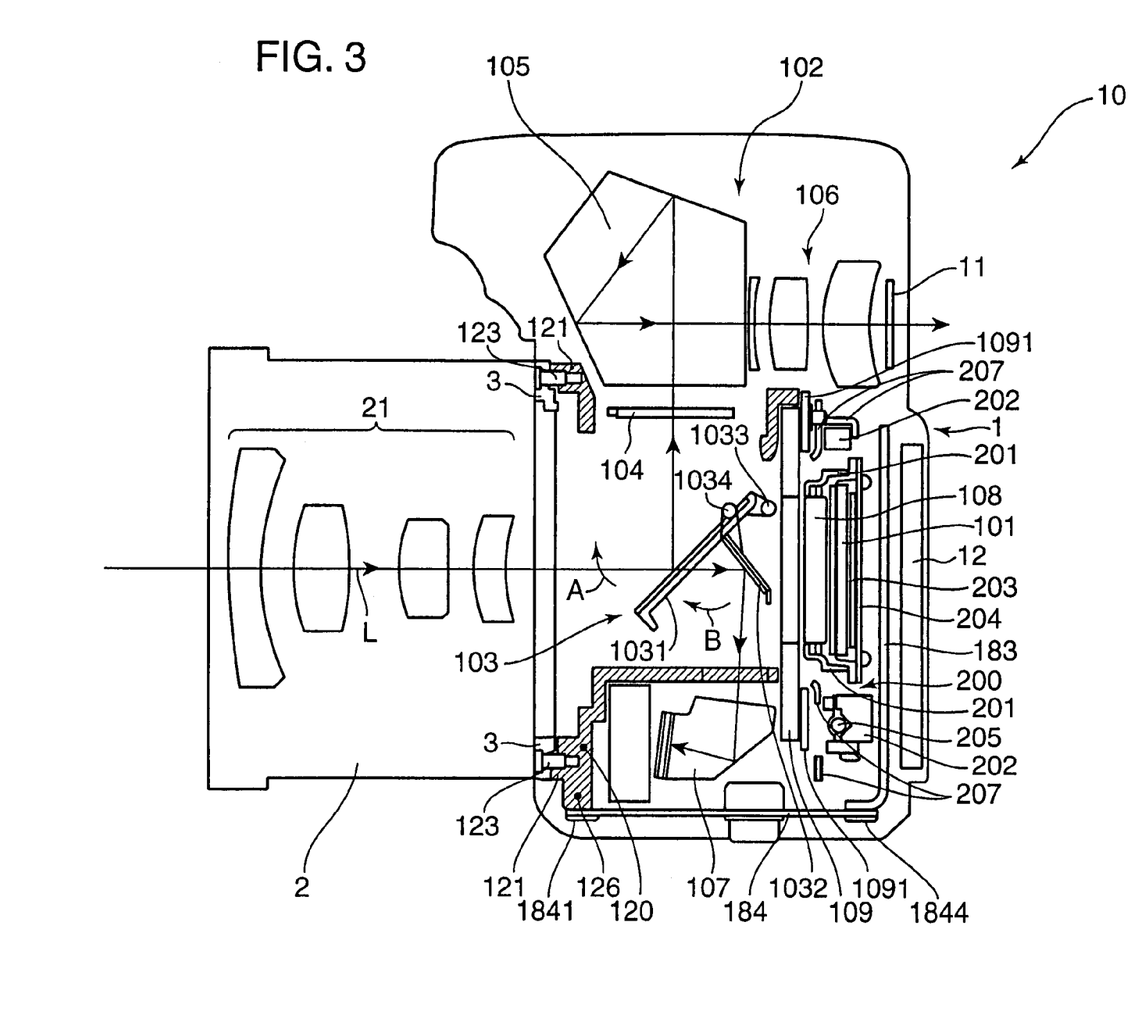
FIG. 3 is a cross-sectional side view of the digital camera.
Figure 4:
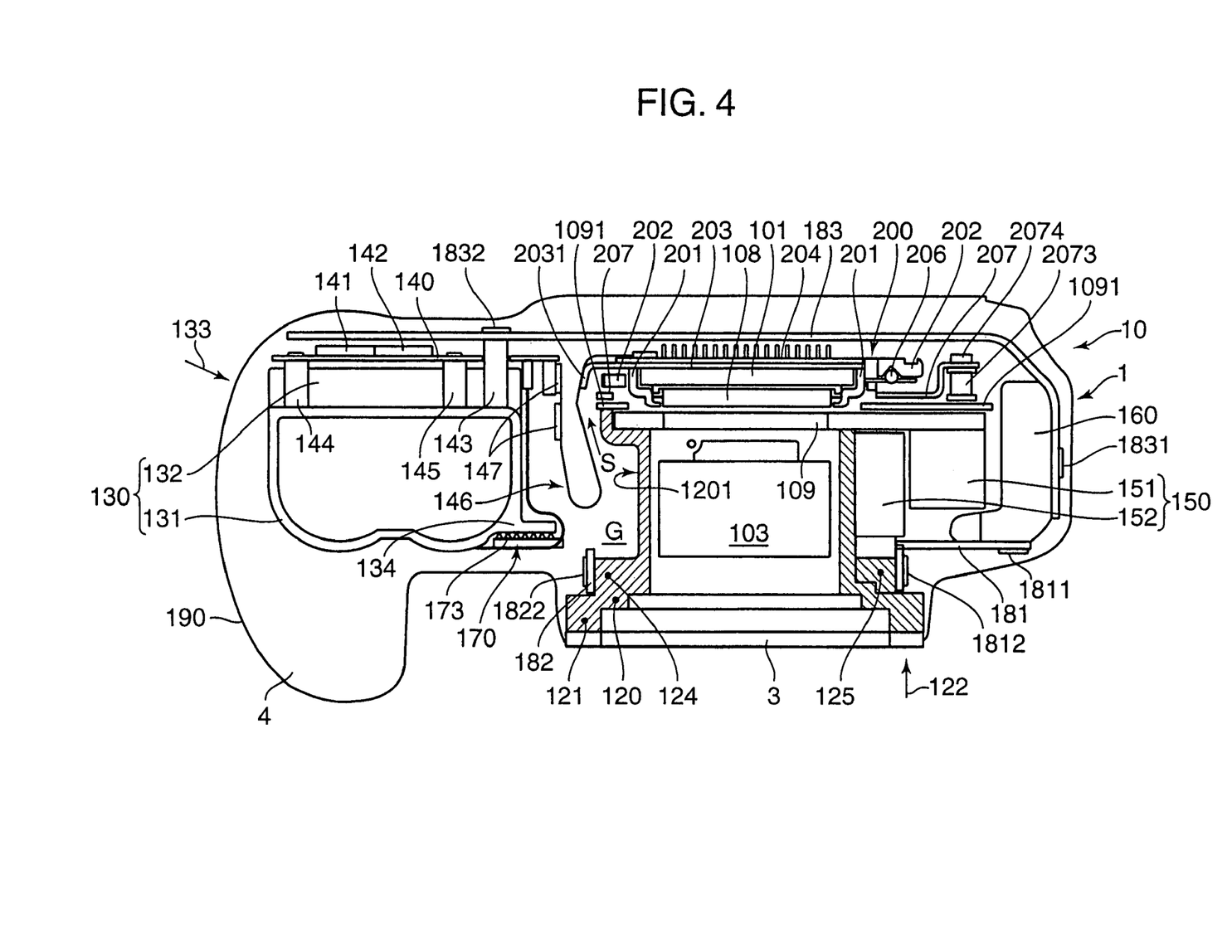
FIG. 4 is a cross-sectional top plan view of the digital camera.

Next, an internal arrangement of the digital camera 10 is described. FIG. 2 is a perspective front view of the digital camera 10, FIG. 3 is a perspective side view of the digital camera 10, and FIG. 4 is a cross-sectional top plan view of the digital camera 10. It should be noted that FIGS. 2 and 4 are a perspective view and a cross-sectional view each showing a state that the taking lens 2 is omitted.

As shown in FIGS. 2 through 4, a rectangular image sensor 101 is provided in the camera body 1 as opposed to the taking lens 2, specifically at an appropriate position in the camera body 1 on an optical axis L (see FIG. 3) of a lens group 21 of the taking lens 2 that is detachably attached to the camera body 1. The image sensor 101 extends in a direction perpendicular to the optical axis L.

The image sensor 101 is adapted to detect brightness of an object to be photographed, namely, to capture the light image of the object. Specifically, the image sensor 101 photoelectrically converts the received light amount of the object light image formed through the taking lens 2 to image signals of color components of red, green, and blue for outputting the signals to a control circuit board 140 (image processing circuit 141). More specifically, the image sensor 101 comprises a single CCD color area sensor of a so-called "Bayer matrix" in which patches of color filters each in red (R), green (G), and blue (B) are attached on respective surfaces of charge coupled devices (CCDs) arrayed in two dimensions, e.g., 1,600 in X-direction and 1,200 in Y-direction, namely, 1,920,000 charge coupled devices in total. Examples of the image sensor 101 are a CCD image sensor, a CMOS image sensor, and a VMIS image sensor.

A mirror section (reflective plate) 103 is arranged at such a position as to reflect the object light image toward a viewfinder section (viewfinder optical assembly) 102. The object light image that has passed through the taking lens 2 is reflected upward by the mirror section 103 (specifically, a main mirror 1031 to be described later), and is imaged on a focusing glass 104. Part of the object light image that has passed through the taking lens 2 is transmitted through the mirror section 103.

The viewfinder section 102 includes a penta prism 105, an eyepiece lens 106, and the viewfinder window 11. The penta prism 105 has a pentagonal shape in cross section, and is a prism member for forming the object light image that has been incident on the viewfinder section 102 from the lower part thereof into an upright image by turning the light image upside down through internal reflection. The eyepiece lens 106 guides the upright object light image outside of the camera body 1 through the viewfinder window 11. With this arrangement, the viewfinder section 102 functions as an optical viewfinder during a photography standby operation.

The mirror section 103 includes the main mirror 1031 and a sub mirror 1032. The sub mirror 1032 is arranged on the rear side of the main mirror 1031 and is rotatably tilted toward the back face of the main mirror 1031. Part of the object light image passing through the main mirror 1031 is reflected on the sub mirror 1032, and the reflected object light image is incident on a focus detecting section 107. The focus detecting section 107 is a so-called AF sensor constituted of a metering device or the like for detecting information as to whether the object light image has been focused.

The mirror section 103 is a so-called quick return mirror. During exposure, the mirror section 103 is quickly pivoted upward in the direction shown by the arrow A in FIG. 3 about an axis of rotation of a rotary shaft 1034, and is retained at a certain position below the focusing glass 104. At this time, the sub mirror 1032 is pivoted in the direction shown by the arrow B in FIG. 3 about the axis of rotation of the rotary shaft 1034 on the rear side of the main mirror 1031. When the main mirror 1031 is retained at the position below the focusing glass 104, the sub mirror 1032 is folded substantially in parallel with the main mirror 1031. As a result, the image sensor 101 is exposed to the object light image passing through the taking lens 2 without being blocked by the mirror section 103. When the exposure is finished, the mirror section 103 is returned to the initial position shown by the solid line in FIG. 3.

A low pass filter (optical filter) 108 is arranged on the optical axis L in front of the image sensor 101 to prevent pseudo color image formation or generation of moiré in color images. A shutter section 109 is arranged in front of the low pass filter 108. The shutter section 109 is controllably opened and closed as timed with the exposure. In this embodiment, the shutter section 109 is, for instance, a vertically traveling focal plane shutter, with a forward portion thereof being brought into contact with a rear end portion of a frame member 120, and a rear portion thereof being pressed against a shutter pressing plate 1091. The shutter pressing plate 1091 is fixed to the frame member 120 by an unillustrated screw. With this arrangement, the shutter section 109 is fixedly supported on the frame member 120. The external display section 12 is arranged behind the image sensor 101 in parallel therewith, with a side chassis 183 interposing between the external display section 12 and the image sensor 101.

The image sensor 101 constitutes a shake correction unit 200 (shake correction mechanism), along with a slider 202 and actuators (yaw actuator 205 and pitch actuator 206). The shake correction unit 200 carries out shake correction by causing the respective actuators 205, 206 to slide the image sensor 101 in forward, backward, leftward, and rightward directions based on information relating to shake of the camera body 1 detected by a gyro unit 170, which will be described later. The arrangement and the operation of the shake correction unit 200 will be described later. The gyro unit 170 is an example of a shake detecting section in the present invention.

Referring to FIG. 2, the frame member (front frame) 120 is arranged substantially in the middle of the camera body 1 behind the mount portion 3 (see the hatched portions in FIGS. 3 and 4). The frame member 120 is a box-like member having a substantially square shape in front view with openings formed in a front portion, a rear portion, and an upper portion thereof. The opening formed in the upper portion opposes the penta prism 105 (focusing glass 104). The frame member 120 is made of a metal having a sufficient rigidity against flexure or a like external force. The frame member 120 has a cylindrical mount receiving portion 121 having a configuration substantially identical to the shape of the mount portion 3. The mount portion 3 is fixed to the mount receiving portion 121 by plural screws 123 from the front side thereof as shown by the arrow 122 (see FIG. 4). The frame member 120 encases the mirror section 103 therein, and functions as a retainer for retaining the mirror section 103 thereon.

As shown in FIG. 4, a battery chamber 131 is formed on the left side of the frame member 120 inside the grip portion 4. The battery chamber 131 is made of a resin such as plastic. A predetermined number of batteries, such as AA size batteries are mountable in the battery chamber 131 as a power source for driving the digital camera 10. A card chamber 132 is formed behind the battery chamber 131. A recording medium such as a memory card for recording image data of photographed images is detachably mountable in the card chamber 132. For instance, the memory card is housed in the card chamber 132 by opening a card chamber door formed on a side portion of the grip portion 4 shown by the arrow 133 in FIG. 4. The battery chamber 131 and the card chamber 132 constitute a battery unit 130, and called as such hereinafter.

A control circuit board 140 is arranged behind the card chamber 132 of the battery unit 130. On the control circuit board 140, there are mounted electronic components such as the image processing circuit 141 (e.g., application specific integrated circuit or ASIC for image processing) of implementing a predetermined signal processing (image processing) with respect to image data, and a shake correction circuit 142 (e.g., ASIC for shake correction) of controllably driving the relevant parts for shake correction, which will be described later. The control circuit board 140 is a base plate member constituting the main controller 100, which will be described later. The control circuit board 140 is arranged in proximity to the shake correction unit 200 on planes substantially identical to each other. The control circuit board 140 is mounted on the battery unit 130 by fastening screws 144, 145 in a state that the battery unit 130 is fixed to the side chassis 183 by way of a connecting portion 143. The control circuit board 140 and the image sensor 101 are electrically connected with each other by a first flexible wiring 146. The shake correction circuit 142 corresponds to a shake correction controlling section in the present invention.

A driving unit 150 is arranged on the right side of the frame member 120 to drive the mirror section 103 and the shutter section 109. The driving unit 150 includes a shutter driving section 151 for drivingly opening and closing the shutter section 109, and a mirror driving section 152 for driving the mirror section 103. The mirror driving section 152 includes a part of the shutter driving section for driving the shutter section. A connector portion 160 made of a resin such as plastic is arranged on a further right side (outer side) of the driving unit 150. The connector portion 160 is a structural unit provided with a holder for a remote terminal or a USB terminal, or with an input jack of an AC power source. The shutter driving section 151 corresponds to a driving member in the present invention.

As shown in FIGS. 2 and 4, the gyro unit 170 is provided at a predetermined position of the battery unit 130, e.g., on a front wall of the battery chamber 131. The gyro unit 170 includes a gyro section 171, a gyro plate 172, a shock absorbing member 173, and a flexible wiring substrate 174 adapted for the gyros. The gyro unit 170 is adapted to detect information relating to shake of an object to be measured (in this embodiment, the digital camera 10 or the camera body 1) such as a swing direction in which the camera body 1 is swung or a moving amount by which the camera body 1 is swung by an impact applied to the camera body 1. The information detected by the gyro unit 170 is used in controlling the relevant parts of the shake correction unit 200 for shake correction. The gyro section 171 has a yaw gyro 171a for detecting a shake amount of the digital camera 10 in the yaw direction based on an angular velocity of the digital camera 10 in the yaw direction when the digital camera 10 is swung, and a pitch gyro 171b for detecting a shake amount of the digital camera 10 in the pitch direction based on an angular velocity of the digital camera 10 in the pitch direction. An exemplified gyro is constructed such that a certain voltage is applied to a piezoelectric device to oscillate the piezoelectric device, and distortion arising from Coriolis action that is generated when an angular velocity due to swing of the camera body 10 is applied to the oscillating piezoelectric device is read as an electric signal. The gyro section 171 is mounted on the gyro plate 172, and the gyro plate 172, namely, the gyro unit 170 is attached to a gyro attachment 134 having a planar shape and formed on a side wall of the battery unit 130 via the shock absorbing member 173.

The shock absorbing member 173 is adapted to keep the gyro section 171 from erroneously detecting vibration of the mirror section 103, and may be a sheet member made of a rubber material such as butyl rubber and formed with adhesive layers on both surfaces thereof. The gyro flexible wiring substrate 174 is adapted to electrically connect the gyro section 171 comprised of the yaw gyro 171a and the pitch gyro 171b with the control circuit board 140.

The respective parts of the digital camera 10 are interlocked with each other while being fixedly supported on a chassis section 180 made of a metal such as iron. In this embodiment, the chassis section 180 is constituted of front chassis 181, 182, the side chassis 183 including a back chassis, and a bottom chassis 184 (bottom plate).

Figure 5:
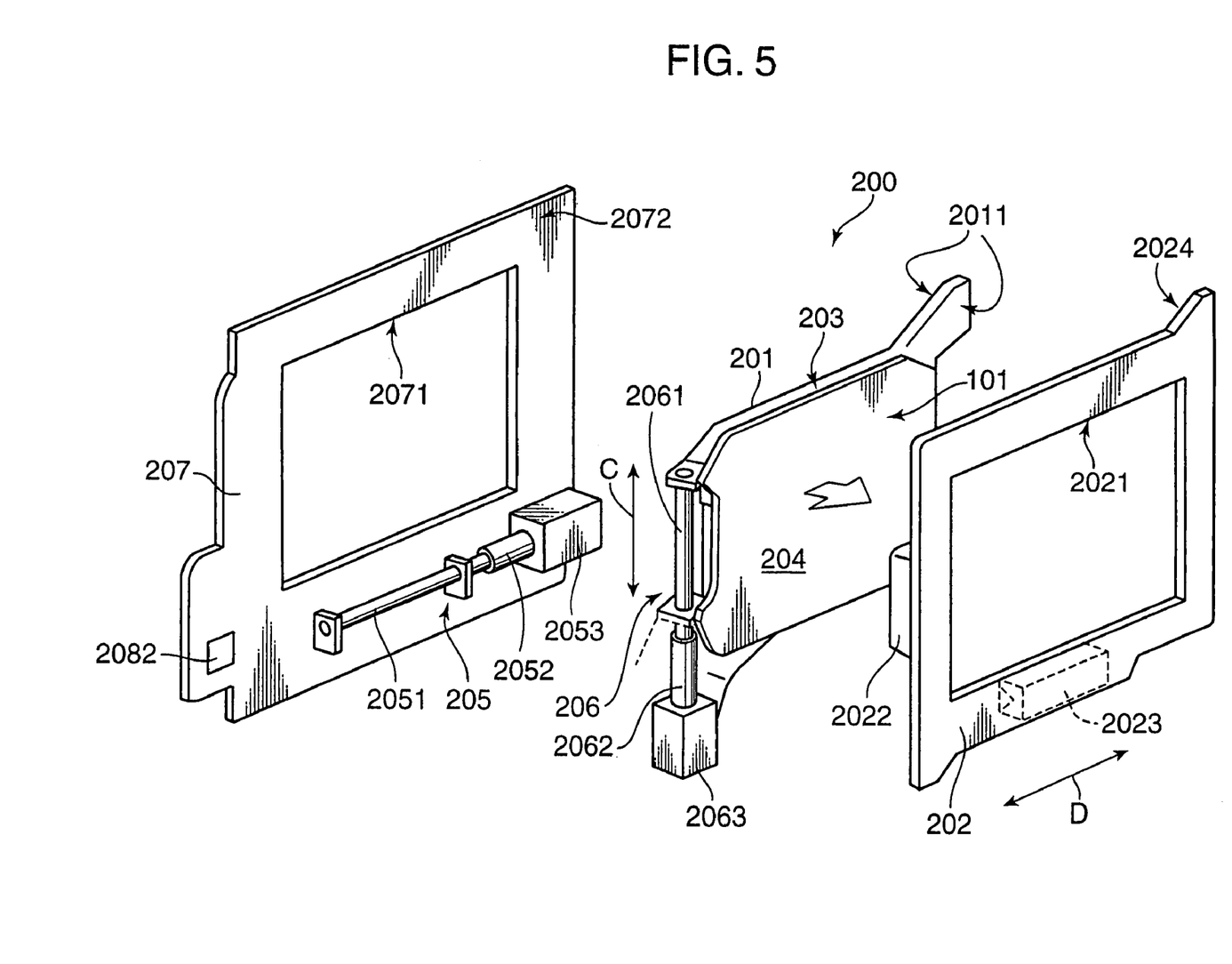
FIG. 5 is an exploded perspective view schematically showing an arrangement of a shake correction unit loaded in the digital camera.

Now, the arrangement of the shake correction unit 200 is described referring to FIGS. 3, 4, and 5. FIG. 5 is a perspective view schematically showing the arrangement of the shake correction unit 200. The shake correction unit 200 is adapted to correct misalignment of the optical axis L by optionally moving (oscillating) the image sensor 101 depending on a shake of the camera body 1 in the case where the shake of the camera body 1 takes place due to hand shake of the user or the like.

The shake correction unit 200 is comprised of the image sensor 101, the low pass filter 108, an image sensor holder 201 for holding the image sensor 101 and the low pass filter 108 thereon, a slider 202 for holding the image sensor holder 201 thereon, a heat releaser 203 arranged behind the image sensor 101, an image sensor substrate 204 arranged behind the heat releaser 203, the yaw actuator 205, the pitch actuator 206, and a shake correction bedplate 207.

The image sensor substrate 204 is a substantially rectangular base plate (in this embodiment, CCD substrate) on which the image sensor 101 is mounted. The image sensor 101 is mounted on the image sensor substrate 204 with the heat releaser 203 being interposed between the image sensor 101 and the image sensor substrate 204. The heat releaser 203 is a plate member made of a metal for releasing heat generated in the image sensor 101 by driving the image sensor 101 for photoelectric converting. The image sensor holder 201 is a frame member of a substantially rectangular shape in cross section with an opening formed in the thickness direction thereof The low pass filter 108 is attached to the front portion of the frame-like image sensor holder 201, and the image sensor 101 is arranged behind the low pass filter 108. The image sensor 101 is supported on the image sensor holder 202 by fixing the image sensor substrate 204 on the image sensor holder 202 by unillustrated screws in a state that the image sensor 101 is pressed against the image sensor holder 201 along with the heat releaser 203 by the image sensor substrate 204.

As shown in FIG. 5, the pitch actuator 206 is provided on the side of a left side portion of the image sensor holder 201, so that the image sensor holder 201 is slidably movable relative to the slider 202 in the pitch direction, namely, upward and downward directions shown by the arrows C in FIG. 5. The slider 202 is a substantially flat planar frame member formed with a rectangular opening 2021 substantially in the middle thereof The opening 2021 has a size larger than the size of the image sensor substrate 204. A rod receiving portion 2022 formed with a V-shaped groove is fixedly attached to the slider 202 at a position corresponding to the pitch actuator 206, so that the slider 202 is movable relative to the image sensor holder 201 by sidable engagement of the pitch actuator 206 (specifically a rod portion 2061 to be described later) with the rod receiving portion 2022. Likewise, a rod receiving portion 2023 is fixedly attached to a lower side portion of the slider 202 at a position corresponding to the yaw actuator 205. The construction of the rod receiving portion 2023 is the same as that of the rod receiving portion 2022. The rod portion 2051 (2061) is frictionally engaged in the rod receiving portion 2023 (2022) in a state that the rod portion 2051 (2061) is pressingly held between a yaw pressing plate (pitch pressing plate) and the rod receiving portion 2023 (2022), respectively, with an urging force of an urging member such as a spring (not shown) being exerted thereto.

The shake correction bedplate 207 serves as a base member of the shake correction unit 200 for holding the slider 202 with the image sensor holder 201 being supported thereon. The shake correction bedplate 207 is a frame member formed with an opening 2071 substantially in the middle thereof The opening 2071 has substantially the same size as the opening 2021 of the slider 202. The yaw actuator 205 is fixedly attached to a lower side portion of the shake correction bedplate 207. The slider 202 is mounted on the shake correction bedplate 207 in such a manner that the rod receiving portion 2023 of the slider 202 sidably engages the yaw actuator 205 (specifically, the rod portion 2051 to be described later) in the yaw direction, namely, leftward and rightward directions shown by the arrows D in FIG. 5.

The shake correction bedplate 207 is interlocked with the slider 202 by causing a corner portion 2024 of the slider 202 to pressingly contact an upper right corner portion 2072 of the shake correction bedplate 207 by an urging force of an urging member such as a spring (not shown) in a state that balls are allowed to roll on respective both surfaces 2011, 2011 of a corner portion of the image sensor holder 201. With this arrangement, the slider 202 and the image sensor holder 201 are pressed toward the shake correction bedplate 207 in a state that the slider 202 is sidably movable in the yaw direction and the image sensor holder 201 is slidably movable in the pitch direction, while securely engaging the shake correction bedplate 207.

The yaw actuator 205 and the pitch actuator 206 are each an impact-type linear actuator (piezoelectric actuator) driven by ultrasonic wave. The yaw actuator 205 (pitch actuator 206) has the rod portion 2051 (2061), a piezoelectric portion 2052 (2062), and a weight portion 2053 (2063). The rod portion 2051 (2061) is a rod having a predetermined shape, e.g., circle in cross section, and is oscillatingly driven by the piezoelectric portion 2052 (2062). The rod portion 2051 (2061) is brought to frictional engagement with the rod receiving portion 2023 (2022).

The piezoelectric portion 2052 (2062) is made of ceramic or a like material, and is expanded or contracted depending on a voltage applied thereto so as to oscillate the rod portion 2051 (2061) based on the expansion or contraction. In the expansion/contraction of the piezoelectric portion 2052 (2062), high speed expansion and low speed contraction, or low speed expansion and high speed contraction, or constant speed expansion and constant speed extraction wherein the speed of the constant speed expansion and the speed of the constant speed contraction are identical to each other, are alternately repeated. The piezoelectric portion 2052 (2062) is, for instance, a laminated piezoelectric device, which is fixedly connected with one end of the rod portion 2051 (2061), with its polarizing direction aligned in the axial direction of the rod portion 2051 (2061).

A signal line from the control circuit board 140 (shake correction circuit 142) is connected with an electrode of the piezoelectric portion 2052 (2062). The piezoelectric portion 2052 (2062) is expanded or contracted by charging or discharging (charging in the reverse direction) the piezoelectric portion 2052 (2062) based on a drive signal sent from the control circuit board 140. As the expansion and contraction of the piezoelectric portion 2052 (2062) is repeated, the rod receiving portion 2023 (2022) of the slider 202 is moved forward or backward relative to the rod portion 2051 (2061), or suspended at a certain position. The weight member 2053 (2063) is fixed to the other end of the rod portion 2051 (2061) as opposed to the piezoelectric portion 2052 (2062) to efficiently transmit oscillation generated in the piezoelectric portion 2052 (2062) to the rod portion 2051 (2061).

Misalignment of the image sensor 101 in the yaw direction shown by the arrows D in FIG. 5 is corrected by integrally sliding the slider 202 and the image sensor holder 201 in transverse directions relative to the shake correction bedplate 207 by driving the yaw actuator 205. Likewise, misalignment of the image sensor 101 in the pitch direction shown by the arrows C in FIG. 5 is corrected by sliding the image sensor holder 201 in vertical directions relative to the slider 202 by driving the pitch actuator 206.

Figure 6A:
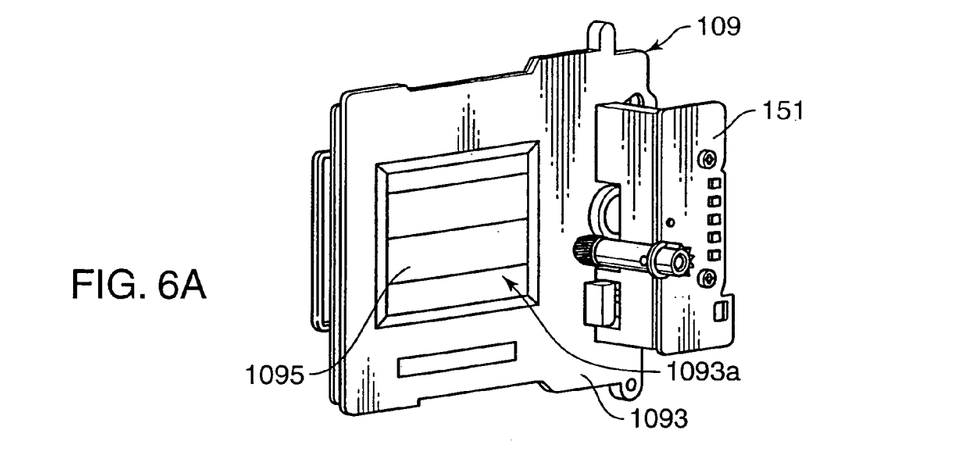
FIG. 6A is a perspective view of a shutter section, an image sensor, a low pass filter, and a shutter driving section, as viewed from the lens-mounted side of the digital camera.
Figure 6B:
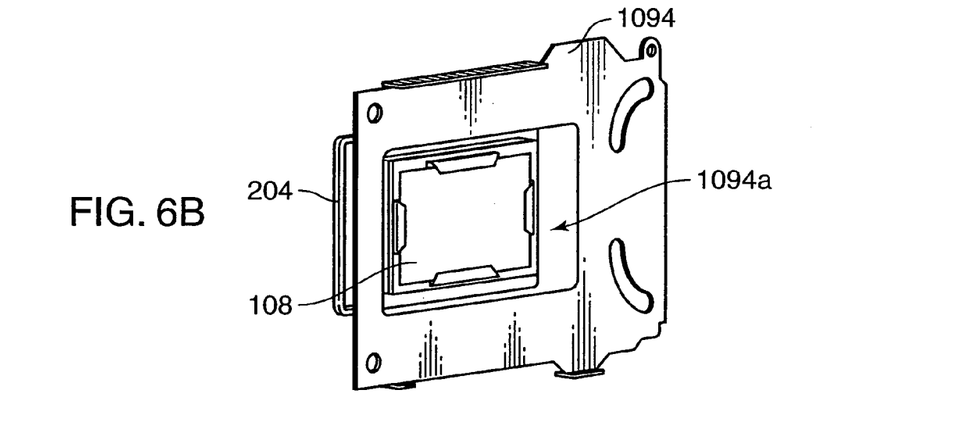
FIG. 6B is a perspective view of the arrangement shown in FIG. 6A, with illustration of a shutter bedplate and a shutter blade group being omitted.
Figure 6C:
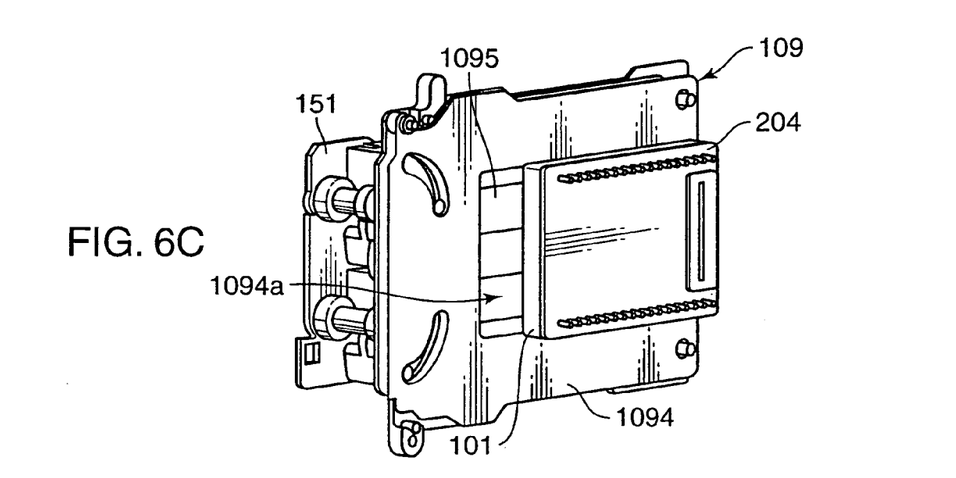
FIG. 6C is a perspective view of the arrangement shown in FIG. 6A, as viewed from the side opposite to the lens-mounted side.
Figure 7A:
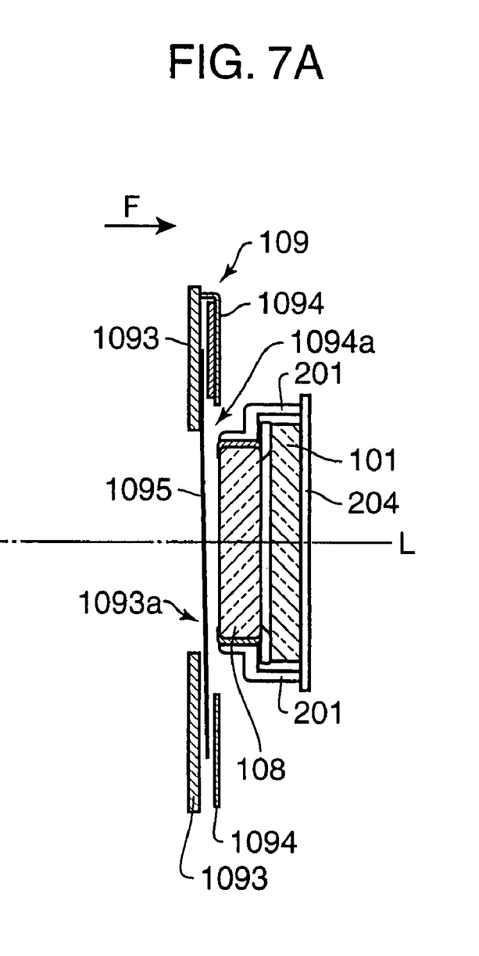
FIG. 7A is a cross-sectional side view of the shutter section.
Figure 7B:
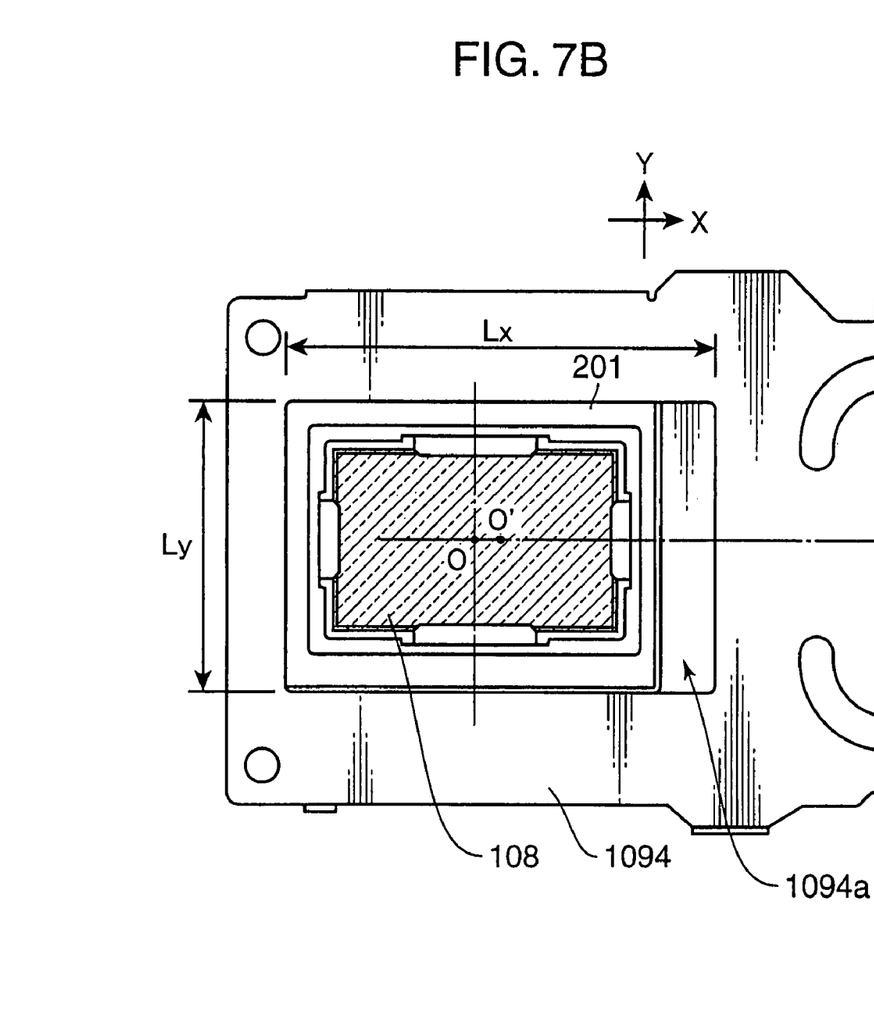
FIG. 7B is an illustration of the arrangement shown in FIG. 7A, as viewed from the direction shown by the arrow F.

Now, features of the embodiment of the present invention are described. FIG. 6A is a perspective view showing the shutter section 109, the image sensor 101, the low pass filter 108, and the shutter driving section 151, as viewed from the side of the lens group 21. FIG. 6B is a perspective view of the arrangement shown in FIG. 6A, with illustration of a shutter bedplate and a shutter blade group to be described later being omitted. FIG. 6C is a perspective view of the arrangement shown in FIG. 6A, as viewed from the side opposite to the lens group 21. FIG. 7A is a cross-sectional side view of the shutter section. FIG. 7B is an illustration of the arrangement shown in FIG. 7A, as viewed from the direction shown by the arrow F, with illustration of the shutter bedplate and the shutter blade group being omitted. In FIGS. 6A through 7B, illustration of the slider 202, and the shake correction bedplate 207 is omitted.

As shown in FIGS. 6A through 7B, the low pass filter 108 is arranged in front of the imaging plane of the image sensor 101 with its centroid aligned with the centroid of the image sensor 101. The image sensor holder 201 and the image sensor substrate 204 in FIGS. 6A through 8B correspond to the image sensor 201 and the image sensor substrate 204 in FIG. 3, respectively. The image sensor 101 and the low pass filter 108 are driven for shake correction, while setting the respective positions where the centroids thereof are aligned with the optical axis L of the lens group 21, as an initial position. In the following, the initial position of the image sensor 101 and the low pass filter 108 is called as "centering position". FIGS. 7A and 7B show a state that the image sensor 101 and the low pass filter 108 are located at the centering position.

The shutter section 109 in FIGS. 6A through 8B corresponds to the shutter section 109 shown in FIG. 3. The shutter section 109 is arranged on a plane perpendicular to the optical axis L on the front side of the low pass filter 108, namely, on-the side of the lens group 21 with respect to the low pass filter 108.

The shutter section 109 includes the shutter bedplate 1093, a shutter base plate 1094, and the shutter blade group 1095. The shutter bedplate 1093 and the shutter base plate 1094 are aligned with each other on the optical axis L in this order from the side of the lens group 21. The shutter blade group 1095 is arranged between the shutter bedplate 1093 and the shutter base plate 1094. The shutter bedplate 1093 and the shutter base plate 1094 support the shutter driving section 151 for driving the shutter blade group 1095, and have a function of guiding movement of the shutter blade group 1095. The shutter driving section 151 is arranged at an appropriate position on a plate face of the shutter bedplate 1093 on the side of the lens group 21. The shutter bedplate 1093 and the shutter base plate 1094 correspond to a shutter bedplate and a shutter base plate in the present invention, respectively.

The shutter bedplate 1093 and the shutter base plate 1094 are formed with openings 1093a and 1094a, respectively, and are arranged at such a position that the entirety of the opening 1093a of the shutter bedplate 1093 is located coaxially within the opening 1094a of the shutter base plate 1094 when viewed from the optical axis direction. With this arrangement, while the shutter section 109 is set to an opened position, light transmitted through the lens group 21 is guided to the low pass filter 108 through the openings 1093a, 1094a. The openings 1093a, 1094a correspond to openings of the shutter bedplate and the shutter base plate in the present invention, respectively.

In this embodiment, the opening 1094a of the shutter bedplate 1094 has a size larger than that of the light receiving plane of the low pass filter 108.

Figure 8A:
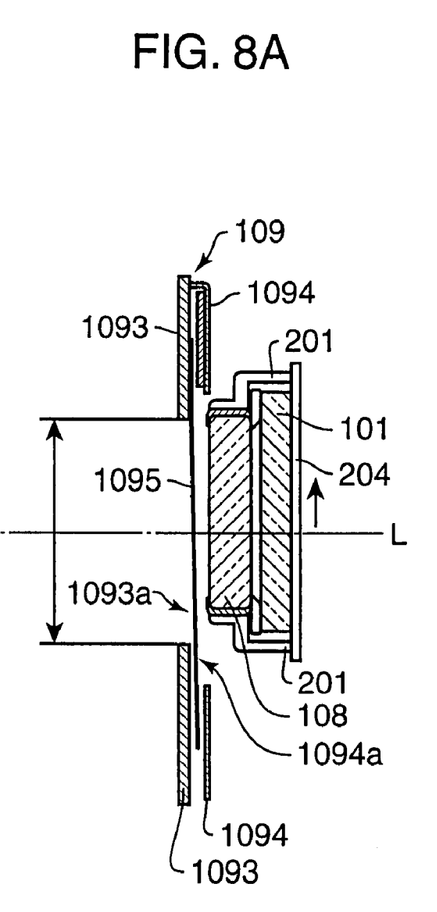
FIGS. 8A and 8B are illustrations showing that the low pass filter and relevant parts are driven from the respective states shown in FIGS. 7A and 7B.
Figure 8B:
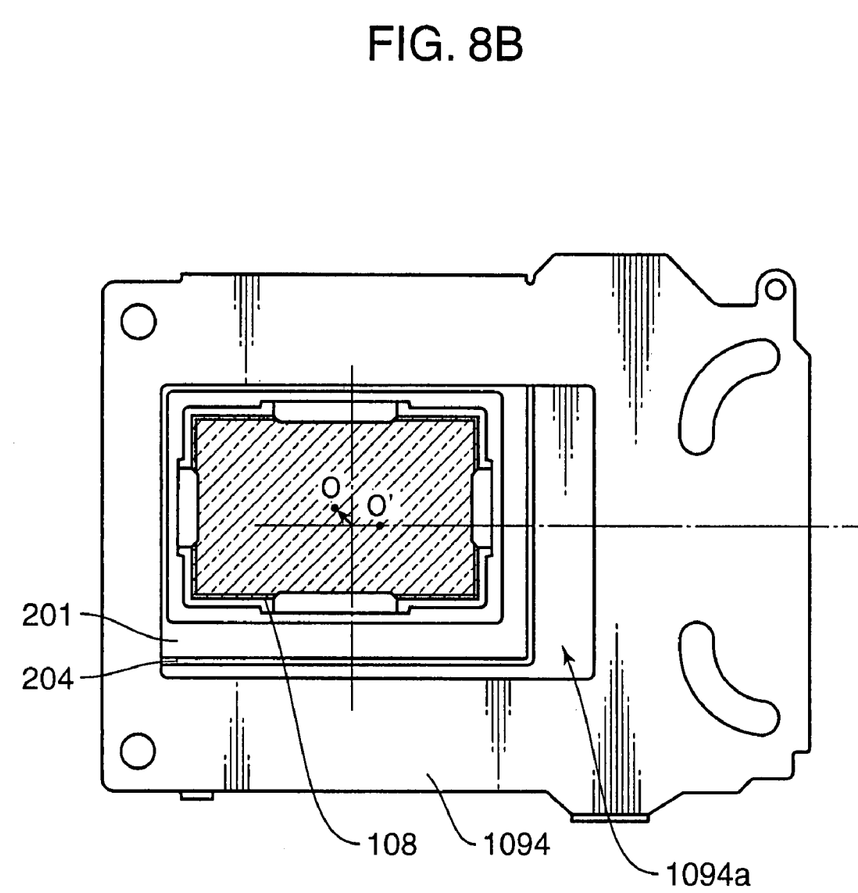

Specifically, the image sensor 101 and the low pass filter 108 are driven in X-axis direction and Y-axis direction (see FIG. 7B) during shake correction. FIGS. 8A and 8B each show a state that the image sensor 101 and the low pass filter 108 are driven leftward in the X-axis direction and upward in the Y-axis direction relative to the centering position shown in FIGS. 7A and 7B.

In this embodiment, the opening 1094a of the shutter base plate 1094 is designed, considering driving amounts of the image sensor 101 and the low pass filter 108 during shake correction, so that the size of the opening 1094a in the X-axis direction (Y-axis direction) is equal to or larger than the sum of the size of the low pass filter 108 and the maximum moving amount of the low pass filter 108 in the X-axis direction (Y-axis direction). More specifically, the length Lx of the opening 1094a of the shutter base plate 1094 in the X-axis direction, and the length Ly thereof in the Y-axis direction respectively satisfy the following equations:

$$Lx \geq X + 2\Delta x$$

$$Ly \geq Y + 2\Delta y$$

where X represents the length of the low pass filter 108 in the X-axis direction, Y represents the length of the low pass filter 108 in the Y-axis direction, $\Delta x$ represents the maximum moving amount of the low pass filter 108 in the X-axis direction with respect to the centering position, and $\Delta y$ represents the maximum moving amount of the low pass filter 108 in the Y-axis direction with respect to the centering position.

With this arrangement, while the image sensor 101 and the low pass filter 108 are driven for shake correction, there is no likelihood that the low pass filter 108 and the shutter base plate 1094 are mechanically interfered with each other, thereby causing collision. Setting the size of the opening 1094a of the shutter base plate 1094 larger, as compared with the conventional arrangement shown in FIGS. 9A and 9B means that the size of the opening 1094a of the shutter base plate 1094 is larger than that of the opening 1093a of the shutter bedplate 1093.

As compared with the conventional arrangement in which the low pass filter is disposed away from the shutter section by a certain distance in the optical axis direction, in this embodiment, the low pass filter 108 and relevant parts can be disposed closer to the shutter section 109 by setting the size of the opening 1094a of the shutter base plate 1094 larger than that of the opening 1093a of the shutter bedplate 1093.

Specifically, as compared with the conventional arrangement shown in FIGS. 9A and 9B, as shown in FIGS. 7A and 7B, the low pass filter 108 is disposed closer to the shutter section 109 by the length r (see FIG. 9A) to such an extent that the light receiving plane of the low pass filter 108 lies on the plate face of the shutter base plate 1094. Thereby, as compared with the conventional arrangement, the thickness of the digital camera 10 in the optical axis direction can be reduced by the length r.

The shutter base plate 1094 that satisfies the above requirements concerning the size of the opening 1094a is used in the conventional silver halide camera. In this embodiment, since the shutter base plate 1094 is used in a digital camera, there is no need of designing a new shutter base plate for the digital camera, which contributes to production cost reduction.

Further, the size of the opening 1094a of the shutter base plate 1094 in the X-axis direction is larger than the corresponding size of the light receiving plane of the low pass filter 108. Accordingly, the shutter base plate 1094 is disposed at such a position that the centroid O' of the opening 1094a of the shutter base plate 1094 is located closer toward the connector portion 160 (rightward in FIG. 4) relative to the centroid O of the low pass filter 108 at the centering position.

Specifically, as compared with a case that the centroid O' of the opening 1094a of the shutter bed plate 1094 is coincident with the centroid O of the low pass filter 108 at the centering position, the above arrangement provides a space corresponding to the site indicated by the arrow S in FIG. 4 for accommodating the flexible wiring 146 in a flexed state therein.

Thus, this arrangement accomplishes miniaturization of the digital camera 10 while acquiring a properly sensed image by securely capturing the object light image in case that a shake correction function that is implemented based on driving of the image sensor 101 is loaded in the digital camera 10 provided with the focal plane shutter and the image sensor 101.

The present invention is not limited to the foregoing embodiment, and the following modifications (i) through (iii) are applicable to the present invention.

(i) In the embodiment, the size of the opening 1094a of the shutter base plate 1094 is set larger than that of the light receiving plane of the low pass filter 108 in light of the arrangement that the digital camera is provided with the low pass filter 108. Alternatively, a similar effect as in the embodiment is obtained by setting the size of the opening 1094a larger than that of the sensing plane of the image sensor 101 in the case where the low pass filter 108 is not provided.

(ii) A similar effect as in the embodiment is obtained by setting the size of the opening 1094a of the shutter base plate 1094 larger as mentioned above, if the digital camera is provided with a function of driving the image sensor 101 for a purpose other than the shake correction.

(iii) The present invention is not only applicable to the digital camera, but also applicable to an image sensing apparatus provided with an image sensor and a focal plane shutter, such as a digital video camera.

BRIEF DESCRIPTION ON THE EMBODIMENTS

In the following, the embodiments of the present invention are described briefly.

(1) A focal plane shutter is a shutter for use in an image sensing apparatus having an imaging unit, the focal plane shutter comprising: a group of shutter blades; a driving member that drives the shutter blades in a certain direction in a predetermined order; a first bedplate formed with a first opening for passing light; and a second bedplate formed with a second opening larger than the first opening, the first bedplate and the second bedplate interposing the shutter blades with each other, and the second bedplate being to be positioned closer to the imaging unit than the first bedplate.

(2) A focal plane shutter is a shutter for use in an image sensing apparatus, the focal plane shutter being arranged on an optical axis of the image sensing apparatus between an imaging optical assembly for imaging an object light image and a light receiving section for receiving the object light image from the imaging optical assembly, the focal plane shutter being operable to block the object light image from being incident on the light receiving section from the imaging optical assembly, the focal plane shutter comprising: a group of shutter blades; a driving member that drives the shutter blades in a certain direction in a predetermined order; a shutter bedplate formed with an opening for passing the object light image from the imaging optical assembly; and a shutter base plate formed with an opening for passing the object light image from the imaging optical assembly, the shutter bedplate and the shutter base plate being aligned substantially in parallel with each other in the optical axis direction, and arranged on a side of the imaging optical assembly and on a side of the light receiving section with respect to the group of shutter blades, respectively, the opening of the shutter base plate having a size larger than a size of the opening of the shutter bedplate and a size of the light receiving section.

In the above arrangement, since the opening of the shutter base plate is set larger than that of the light receiving plane of the light receiving section, blocking of incidence of the light image onto the light receiving plane of the light receiving section by the shutter base plate can be avoided or suppressed even in a case that the image sensing apparatus provided with the focal plane shutter has a function of driving the light receiving section on a plane perpendicular to the optical axis of the imaging optical assembly.

Further, this arrangement contributes to production cost reduction by merely setting the opening of the shutter base plate larger than the opening of the shutter bedplate in the conventionally available focal plane shutter.

The light passing through the opening of the shutter bedplate is guided to the light receiving section without being blocked by the shutter base plate by arranging the shutter bedplate and the shutter base plate in such a manner that the entirety of the opening of the shutter bedplate is overlapped with the opening of the shutter base plate viewed from the direction of a normal line to the shutter bedplate.

(3) An image sensing apparatus is an apparatus comprising: the focal plane shutter (2), and the light receiving section having a light receiving plane substantially parallel with the focal plane shutter for receiving the object light image through the focal plane shutter.

In the above arrangement, the same effect as in the arrangement (2) is obtained. Further, since the opening of the shutter base plate located on the side of the light receiving section relative to the shutter bedplate has a size larger than that of the light receiving plane of the light receiving section, the light receiving section can be arranged closer to the focal plane shutter in the optical axis direction. This arrangement enables to reduce the thickness of the image sensing apparatus in the optical axis direction, as compared with the conventional arrangement, which contributes to miniaturization of the image sensing apparatus.

(4) Preferably, an image sensing apparatus is the apparatus (3), further comprising the imaging optical assembly that images the object light image on the light receiving section, and a driving section that drives the light receiving section in two directions perpendicular to each other on an imaging plane of the imaging optical assembly, wherein the light receiving plane of the light receiving section is moved within a region of the opening of the shutter bedplate viewed from a direction of a normal line to the shutter bedplate.

In the above arrangement, since the light receiving plane of the light receiving section is driven within the region of the opening of the shutter bedplate viewed from the direction of the normal line to the shutter bedplate, blocking of incidence of the light image onto the light receiving plane of the light receiving section by the shutter bedplate is avoided or suppressed.

(5) Preferably, an image sensing apparatus is the apparatus (3) or (4), wherein the opening of the shutter base plate has the size larger than an allowable moving range of the light receiving plane of the light receiving section, and a centroid of the opening of the shutter base plate is disposed away from a centroid of the allowable moving range in a certain direction.

In the above arrangement, the shutter base plate is arranged with the centroid of the opening thereof being away from the centroid of the allowable moving range of the light receiving plane of the light receiving section in the certain direction, a space can be defined in the image sensing apparatus on the side opposite to the certain direction, as compared with the case that the centroid of the opening of the shutter base plate is coincident with the centroid of the allowable moving range. Thereby, an additional member can be disposed in the newly defined space.

(6) Preferably, an image sensing apparatus is the apparatus (4) or (5), further comprising a shake detecting section that detects a shake of the image sensing apparatus and outputs a shake detection signal indicative of the shake of the image sensing apparatus, and a shake correction controlling section that generates a shake correction amount and a shake correcting direction for canceling the shake, based on the shake detection signal outputted from the shake detecting section, wherein the driving section drives the light receiving section based on the shake correction amount and the shake correcting direction generated in the shake correction controlling section.

In the above arrangement, the same effect as in any of the arrangements (2) through (5) is obtained in the image sensing apparatus provided with the shake correction function with use of the light receiving section.

(7) Preferably, an image sensing apparatus is any one of the apparatuses (3) through (6), wherein the light receiving section includes an image sensor that receives the object light image from the imaging optical assembly for photoelectrical conversion.

In the above arrangement, the same effect as in any of the arrangements (3) through (6) is obtained in the image sensing apparatus provided with the image sensor.

(8) Preferably, an image sensing apparatus is the apparatus (7), wherein the light receiving section includes a low pass filter that passes and guides, onto the image sensor, light of a frequency lower than a predetermined frequency in the object light image formed through the imaging optical assembly.

In the above arrangement, the same effect as in any of the arrangements (2) through (6) is obtained in the image sensing apparatus provided with the low pass filter and the image sensor. In this case, the same effect as in any of the arrangements (2) through (7) is obtained by setting the size of the opening of the shutter base plate larger than that of the light receiving plane of the low pass filter.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image sensing apparatus comprising: a focal plane shutter that is arranged on an optical axis of the image sensing apparatus between an imaging optical assembly for imaging an object light image and a light receiving section for receiving the light image from the imaging optical assembly, the focal plane shutter being operable to block the object light image from being incident on the light receiving section from the imaging optical assembly, the focal plane shutter including: a group of shutter blades;
a driving member that drives the shutter blades in a certain direction in a predetermined order;
a shutter bedplate formed with an opening for passing the object light image from the imaging optical assembly; and
a shutter base plate formed with an opening for passing the object light image from the imaging optical assembly,
the shutter bedplate and the shutter base plate being aligned substantially in parallel with each other in the optical axis direction, and arranged on a side of the imaging optical assembly and on a side of the light receiving section with respect to the group of shutter blades, respectively,
the opening of the shutter base plate has a size larger than a size of the opening of the shutter bedplate and a size of the light receiving section,
the light receiving section having a light receiving plane substantially parallel with the focal plane shutter for receiving the object light image through the focal plane shutter,
an imaging optical assembly that images the object light image on the light receiving section, and a driving section that drives the light receiving section in two
directions perpendicular to each other on an imaging plane of the imaging optical assembly, wherein the light receiving plane of the light receiving section is moved within a region of the opening of the shutter bedplate viewed from a direction of a normal line to the shutter bedplate, and
a shake detecting section that detects a shake of the image sensing apparatus and outputs a shake detection signal indicative of the shake of the image sensing apparatus, and a shake correction controlling section that generates a shake correction amount and a shake correcting direction for canceling the shake, based on the shake detection signal outputted from the shake detecting section, wherein the driving section drives the light receiving section based on the shake correction amount and the shake correcting direction generated in the shake correction controlling section.

2. The image sensing apparatus according to claim 1, wherein the opening of the shutter base plate has the size larger than an allowable moving range of the light receiving plane of the light receiving section, and a centroid of the opening of the shutter base plate is disposed away from a centroid of the allowable moving range in a certain direction.

3. The image sensing apparatus according to claim 1, wherein the light receiving section includes an image sensor that receives the object light image from the imaging optical assembly for photoelectrical conversion.

4. The image sensing apparatus according to claim 3, wherein the light receiving section includes a low pass filter that passes and guides, onto the image sensor, light of a frequency lower than a predetermined frequency in the object light image formed through the imaging optical assembly.

* * * * *